United States Patent [19]

Sevigny et al.

[11] Patent Number: 5,358,045
[45] Date of Patent: Oct. 25, 1994

[54] ENHANCED OIL RECOVERY METHOD EMPLOYING A HIGH TEMPERATURE BRINE TOLERANT FOAM-FORMING COMPOSITION

[75] Inventors: Willard J. Sevigny; Donald L. Kuehne, both of Hercules; Jeremy Cantor, Benicia, all of Calif.

[73] Assignee: Chevron Research and Technology Company, a Division of Chevron U.S.A. Inc., San Francisco, Calif.

[21] Appl. No.: 17,294

[22] Filed: Feb. 12, 1993

[51] Int. Cl.$^5$ ............................................. E21B 43/22
[52] U.S. Cl. ................................... 166/273; 166/274; 166/309; 252/8.554
[58] Field of Search ............... 166/268, 273, 274, 275, 166/309; 252/8.554

[56] References Cited

U.S. PATENT DOCUMENTS

| | | | |
|---|---|---|---|
| 2,623,596 | 12/1952 | Whorton . | |
| 3,065,790 | 11/1962 | Holm . | |
| 3,529,668 | 9/1970 | Bernard | 166/273 |
| 4,380,266 | 4/1983 | Wellington | 166/252 |
| 4,502,538 | 3/1985 | Wellington et al. | 166/252 |
| 4,576,232 | 3/1986 | Duerksen et al. | 166/273 X |
| 4,739,831 | 4/1988 | Settlemeyer et al. | 166/273 |
| 4,763,730 | 8/1988 | Suzuki | 166/273 |
| 4,860,828 | 8/1989 | Oswald et al. | 166/274 |
| 5,193,618 | 3/1993 | Loh et al. | 166/273 X |
| 5,203,411 | 4/1993 | Dawe et al. | 166/268 X |

*Primary Examiner*—George A. Suchfield
*Attorney, Agent, or Firm*—E. A. Schaal; W. K. Turner

[57] ABSTRACT

An enhanced oil recovery technique for recovering hydrocarbons from a reservoir during gas injection comprises the at least periodic injection of gas and a foam-forming composition into the reservoir. The foam-forming composition comprises water, an effective foam-forming amount of a $C_{10-16}$ α-olefin sulfonate surfactant including $C_{10}$ AOS and/or $C_{12}$ AOS, and an effective amount of at least one solubilizing component to increase the brine tolerance of the composition. This solubilizing component is a mixture comprising

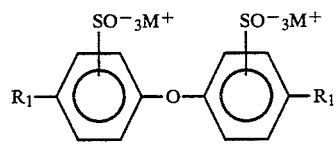

and

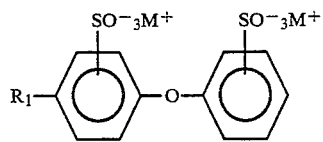

where M is H, an alkali metal, alkaline earth metal, or ammonium, where $R_1$ is a linear $C_6$–$C_{16}$ alkyl group. The method further comprises contacting the hydrocarbons in the reservoir with the foam so as to assist in the recovery of hydrocarbons from the reservoir.

10 Claims, No Drawings

ENHANCED OIL RECOVERY METHOD EMPLOYING A HIGH TEMPERATURE BRINE TOLERANT FOAM-FORMING COMPOSITION

BACKGROUND OF THE INVENTION

The present invention relates to a composition and method for enhancing the recovery of petroleum from an oil-bearing formation.

In the recovery of oil from reservoirs, the use of primary production techniques (i.e., the use of only the initial formation energy to recover the crude oil) followed by the secondary technique of waterflooding, recovers only a portion of the original oil present in the formation.

Moreover, the use of certain enhanced oil recovery (EOR) techniques is also known in the art. These techniques can generally be classified as either a thermally based recovery technique, e.g., utilizing steam, or a gas drive method that can be operated under miscible or non-miscible conditions.

The gases which are commonly employed in gas-drive methods include for example, nitrogen, carbon dioxide, methane, mixtures of methane with ethane, propane, butane, and higher hydrocarbon homologues. This class of gases includes both natural gas and produced gas.

A typical procedure involves injecting a slug of $CO_2$ followed by the injection of a higher viscosity fluid such as water to "push" the $CO_2$. See, for example, the discussion in U.S. Pat. No. 2,623,596. Moreover, U.S. Pat. No. 3,065,790 indicates that this process may be more cost effectively employed if the slug of $CO_2$ is relatively small. In fact, as illustrated by U.S. Pat. No. 3,529,668, this type of recovery procedure is typically performed in "water alternating gas (WAG)" cycles.

Because of the viscosity and density differences between the $CO_2$ and the oil (i.e., viscosity of $CO_2$ is only 5 to 10% of the viscosity of light oil), the $C_2$ tends to bypass much of the oil when flowing through the pores of the reservoir rock.

One proposed solution to this problem associated with the bypassing of the $CO_2$ includes the injection of water which contains a surfactant, with the $CO_2$. In particular, surfactants have been proposed as a means for generating a foam or an emulsion in the formation. See, for example, U.S. Pat. No. 4,380,266 to Wellington, U.S. Pat. No. 4,860,828 to Oswald et al and U.S. Pat. No. 5,502,538 to Wellington et al.

The purpose of this foam is to divert the flow of the $C_2$ into that portion of the formation containing high oil saturation.

One surfactant composition includes alpha-olefin sulfonate (AOS) surfactants and in particular $C_{12}$ AOS, i.e., an AOS having a carbon chain length of 12.

Furthermore, although AOS surfactants are largely known as "good foamers", the creation of an effective foam requires that the surfactant be completely soluble in the injection water. Solubility is limited when employing AOS having longer chain lengths, i.e., greater than about $C_{10}$, by the amount of salt in the injection water or formation brine. This is a particular problem when the salt concentration is above about 15 wt %.

In such environments, the AOS can separate out and become adsorbed onto the formation rock. Thus, any foam which is formed is not effectively propagated through the reservoir.

In order to solve problems associated with brine tolerance, a variety of materials are recognized in the art as being effective "solubilizers", i.e., compounds which are not suitable foaming agents but which can improve brine tolerance of less brine tolerant materials. Materials which have been employed as solubilizers include nonionic surfactants such as ethoxylated nonylphenols and secondary alcohols, ethylene/propylene oxide copolymers, fatty acid ethanolamides, glycols, and polyglycosides as well as certain anionic, cationic and amphoteric surfactants and certain sequesterants. See for example, the discussion in McCutcheon's Functional Materials, pp 220-230, 1989.

However, these materials have not proven effective with $C_{10-16}$ AOS surfactants, particularly when employed in brines at high temperatures, i.e., above about 100° F. Accordingly, the need still exists for a foam-forming composition comprising $C_{10-16}$ AOS surfactants which has improved brine tolerance.

These and further aspects will become apparent from the specification and drawings which follow.

SUMMARY OF THE INVENTION

Among other factors, the present invention is based upon the surprising discovery that the use of certain "solubilizers" can effectively provide brine tolerance for enhanced oil recovery compositions containing certain AOS surfactants.

In one aspect, the present invention relates to a method of recovering hydrocarbons from a reservoir during gas injection into said reservoir and comprises at least periodically injecting the gas and a foam-forming surfactant composition that includes a $C_{10}$ α-olefin sulfonate (AOS) and/or a $C_{12}$ AOS, into the reservoir.

In particular, this composition includes brine, an effective foam-forming amount of surfactant composition including a $C_{10}$ AOS and/or $C_{12}$ AOS, and an effective amount of at least one solubilizing component so as to increase brine tolerance of the composition. The solubilizing component comprises a mixture of

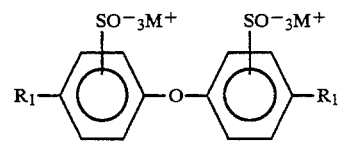

and

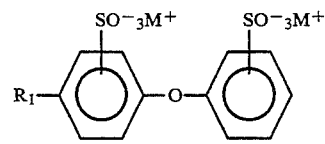

where

M is H, an alkali metal, alkaline earth metal or ammonium, and $R_1$ is a linear $C_6$-$C_{16}$ alkyl group.

The method further comprises contacting the hydrocarbons in the reservoir with the foam and the gas so as to assist in the recovery of hydrocarbons from the reservoir.

In another aspect, the invention relates to a foam-forming composition comprising brine, an effective foam-forming amount of surfactant composition including a $C_{10}$ AOS and/or $C_{12}$ AOS, and an effective amount of the at least one solubilizing component to increase brine tolerance of the composition.

DETAILED DESCRIPTION OF THE PREFERRED EMBODIMENTS

The present invention relates to a method and composition for enhancing the recovery of petroleum from oil-bearing formations and in particular, compositions including brine with a total dissolved solids (TDS) content from about 10–15% to as high as about 20–25 wt %. Furthermore, it can be employed in a reservoir having temperatures as high as 250° F. with typical temperatures of reservoirs in which it is employed being above about 100° F.

This method utilized a foam-forming composition which can be effectively employed with gas. In particular, this foam-forming composition includes $C_{10}$ AOS and/or $C_{12}$ AOS surfactant, and at least one solubilizing component which is present in an effective amount to increase the brine tolerance of the composition.

A surfactant composition containing $C_{12}$ AOS is preferred due to its foamability and because it is soluble in brines containing up to 20–25 wt % TDS when an effective amount of at least one solubilizing component is present.

This surfactant composition can comprise, for example, a $C_{10\text{-}16}$ AOS composition.

In as far as AOS compositions typically include a combination of sulfonate components, by "$C_{10\text{-}12}$" it is meant that an $\alpha$-olefin sulfonate includes one or more of $C_{10}$ $\alpha$-olefin sulfonate and $C_{12}$ $\alpha$-olefin sulfonate. Similarly, by "$C_{10\text{-}16}$" it is meant that the $\alpha$-olefin sulfonate composition includes one or more $\alpha$-olefin sulfonates having a chain length of 10–16 carbon atoms. In light of the foregoing discussion, the $C_{10\text{-}16}$ composition employed in the present invention includes $C_{10}$ AOS and/or $C_{12}$ AOS therein. Moreover, when other surfactants are present, the $C_{10}$ AOS and/or $C_{12}$ AOS component form a major part, e.g., preferably greater than 80% by weight, of the surfactant composition.

The choice of the particular AOS composition to be employed in the present invention depends on balancing foamability against brine tolerance in the desired environment. Foamability increases with the length of the carbon chain whereas, brine tolerance decreases. See, for example, U.S. Pat. No. 4,769,730 to Suzuki. Accordingly, the particular additional AOS composition is selected based upon the certain practical factors, i.e., cost and the oil-bearing formation in which it is to be employed.

The AOS composition can be produced by methods which are well recognized in the art and thus not be described in detail here.

In this regard, AOS typically includes both hydroxy-sulfonates and alkene-sulfonates. The hydroxy sulfonates include both 3-hydroxy and 4-hydroxy sulfonates while the alkene-sulfonates include alkene-1-sulfonates (alkene-1), alkene-2-sulfonates (alkene-2), alkene-3-sulfonates (alkene-3), alkene-4-sulfonates (alkene-4), alkene-5-sulfonates (alkene-5), alkene-6-sulfonates (alkene-6), alkene-7-sulfonates (alkene-7) and alkene-8-sulfonates (alkene-8).

Alkene-disulfonates can also be present in the AOS, however, current art-recognized methods of making AOS compositions are effective in minimizing the disulfonate formation by the choice of equipment employed as well as control of processing conditions.

The foam-forming composition employed in the present invention also includes at least one solubilizing component which is present in the amount effective to increase the brine tolerance of the surfactant composition. This solubilizing component is a mixture containing

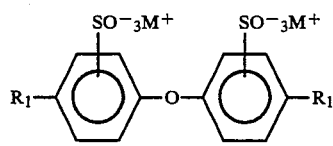

and

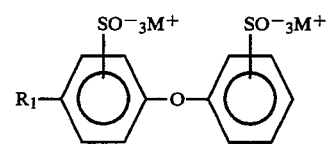

where M is H, an alkali metal, alkaline earth metal, or ammonium, where $R_1$ is a linear $C_6$–$C_{16}$ alkyl group.

Preferred solubilizing components are those mixtures where $R_1$ is a $C_6$, $C_{10}$ or $C_{16}$ alkyl group with $C_6$ alkyl group being more preferred. Furthermore, M is preferably sodium. More than one of the solubilizing components can also be employed in the foam-forming composition.

Suitable mixtures include certain of those commercial solutions available from Dow Chemical Company under the "DOWFAX" tradenames, i.e., "DOWFAX" 3B2, "DOWFAX" 8390, and "DOWFAX" XDS 8292.00 (which is soon to be renamed "DOWFAX CGL"). Formulations of these solutions are:

| "DOWFAX" 3B2 | | |
|---|---|---|
| Decyl(sufophenoxyl)benzene-sulfonic acid, disodium salt, and | CAS# 036445-71-3 | |
| Oxybis(decylbenzenesulfonic acid), disodium salt | CAS# 070146-13-3 | 47% Max. |
| Sodium sulfate | CAS# 007757-82-6 | 1.5% Max. |
| Sodium chloride | CAS# 007647-14-5 | 3% Max. |
| Water | CAS# 007732-18-5 | Balance |
| "DOWFAX" 8390 | | |
| Disodium hexadecyldiphenyl-oxide disulfonate, and | CAS# 065143-89-7 | |
| Disodium dihexadecyldiphenyl-oxide disulfonate | CAS# 070191-76-3 | 40% Max. |
| Sodium Sulfate | CAS# 007757-82-6 | 3% Max. |
| Sodium chloride | CAS# 007647-14-5 | 3% Max. |
| Methylene chloride | CAS# 000075-09-2 | 2% Max. |
| Water | CAS# 007732-18-5 | Balance |
| "DOWFAX XDS" 8292.00 | | |
| Hexyl(sulfophenoxy)benzene sulfonic acid disodium salt, and | | |
| Oxybis(hexylbenzenesulfonic acid) disodium salt | | 45% Max. |
| Sodium sulfate | CAS# 007757-82-6 | 3% Max. |
| Sodium chloride | CAS# 007647-14-5 | 3% Max. |
| Methylene chloride | CAS# 000075-09-2 | 2% Max. |
| Water | CAS# 007732-18-5 | Balance |

Solubilizing components of the present invention can be prepared by methods recognized in the art. For example, attention is directed towards U.S. Pat. No. 4,860,828 to Oswald et al which is incorporated herein by reference.

Due to cost and foamability considerations, it is preferred that the amount of solubilizing component be minimized. Accordingly, it is preferred that the ratio of foam-forming surfactant to solubilizing component be not less than about 3:1, more preferably, not less than about 4:1 with not less than about 10:1 being even more preferred.

However, the effective ratio which is ultimately employed will also depend on other factors, e.g., the temperature and salinity of the reservoir and the particular AOS composition.

The foam-forming composition is preferably formed as a concentrate comprising the surfactant composite, solubilizing component, and water. In use, the concentrate is preferably diluted with additional water to a working strength of about 0.01 to about 1 wt % total surfactants, more preferably 0.1% to about 0.5 wt % total surfactants based on the total weight.

Although produced water, e.g., from the reservoir is a typical diluent, the choice of a diluent is based upon the requirements of the reservoir to be treated, economics, and compatibility of the composition upon dilution.

This invention will find particular applicability with brines having a TDS content of from about 10 to 25 wt %, with 15-25 wt % being preferred.

The foam-forming compositions according to the present invention may also contain minor amounts of other surface active agents. For example, cosurfactants such as amphoteric surfactants, as well as scale inhibitors, such as AOS dimers and chelating agents, may be present. The total amount of these additional surface active agents is preferably not greater than about 10% by weight of the other components of the mixture.

The gas which can be employed includes any of those known in the art, e.g., carbon dioxide, nitrogen, methane, flue gas and the like or mixtures of hydrocarbons such as methane with any of ethane, propane, or butane, flue gas and the like.

It is to be understood by those skilled in the art that this composition can be used either in cyclic ("huff and puff") or drive recovery methods under either miscible or immiscible conditions.

In using the foam-forming composition for the enhanced recovery of petroleum, the foam may either be preformed or formed "in situ" (e.g., through introduction of alternate slugs of gas and foam-forming composition into the formation). In either method, any of the procedures recognized in the art for injecting a foam into a formation may be employed. Moreover, although the composition of the oil-bearing formation is not critical to the present invention, it finds particular utility in sandstone reservoirs.

The following examples illustrate advantages which can be associated with the present invention, which examples are understood to be illustrative and in nowise limitive.

EXAMPLES

The following examples illustrate the surprising effectiveness of those solubilizers employed in the present invention in improving the brine tolerance of $C_{10-16}$ AOS surfactants and in particular $C_{12}$ AOS.

In each of these examples, the solubilizing component and $C_{12}$ AOS were added separately to a beaker and then diluted with synthetic brine. The $C_{12}$ AOS employed in the examples was obtained from Witco Chemicals Co. under the "WITCONATE" tradename.

The following brines were employed in the examples:

| Brine A: | NaCl | 139.4 g/kg |
| | $CaCl_2$ | 38.4 g/kg |
| | $MgCl_2$ | 16.5 g/kg |
| | | 194.3 g/kg, or 19.4% Total Dissolved Solids (TDS) |
| | Total divalent cations ($Mg^{++} + Ca^{++}$): 18.1 g/kg | |
| Brine B: | NaCl | 153.3 g/kg |
| | $CaCl_2$ | 42.2 g/kg |
| | $MgCl_2$ | 18.2 g/kg |
| | | 213.7 g/kg, or 21.4% TDS |
| | Total divalent cations ($Mg^{++} + Ca^{++}$): 19.9 g/kg | |
| Brine C: | NaCl | 156.8 g/kg |
| | $CaCl_2$ | 28.5 g/kg |
| | $MgCl_2$ | 7.5 g/kg |
| | | 192.8 g/kg, or 19.3% TDS |
| | Total divalent cations ($Mg^{++} + Ca^{++}$): 12.2 g/kg | |

Brine B has 10% more of salt component than Brine A. Although Brine A and Brine C have nearly the same percentage of TDS, Brine A has more divalent cations (i.e., hardness), so it provides a more rigorous test of surfactant solubility.

EXAMPLE 1

In this example, five different surfactant solutions were tested at differing concentrations with Brine A under unheated conditions and at 150° F.

For comparative purposes, another "DOWFAX" surfactant, i.e., "DOWFAX" 2A1, and sodium xylene sulfonate were also employed as a stabilizing component. "DOWFAX" 2A1 is as follows:

| "DOWFAX" 2A1 | | |
| --- | --- | --- |
| Benzene,1,1,oxybis-tetra-propylene derivatives, sulfonated, sodium salts | CAS# 119345-04-9 | 47% Max. |
| Sodium sulfonate | CAS# 007757-82-6 | 1% Max. |
| Sodium chloride | CAS# 007647-14-5 | 3% Max. |
| Water | CAS# 007732-18-5 | Balance |

The results associated with these solutions are illustrated in Table I.

TABLE I

| | RATIO OF AOS TO SOLUBILIZER: | | | | | | | | | | | |
| --- | --- | --- | --- | --- | --- | --- | --- | --- | --- | --- | --- | --- |
| | UNHEATED | | | | | | 150° F. | | | | | |
| | AFTER 7 DAYS | | | AFTER 13 DAYS | | | AFTER 7 DAYS | | | AFTER 13 DAYS | | |
| | 20:1 | 9:1 | 4:1 | 20:1 | 9:1 | 4:1 | 20:1 | 9:1 | 4:1 | 20:1 | 9:1 | 4:1 |
| "DOWFAX" 2A1 | ○ | ○ | ○ | ○ | ○ | ○ | ◉ | ◉ | ◉ | ◉ | ◉ | ◉ |
| "DOWFAX" 3B2 | ○ | ○ | ○ | ○ | ○ | ○ | ◉ | ◉ | ○ | ◉ | ◉ | ◉ |
| "DOWFAX" 8390 | ○ | ○ | ○ | ○ | ○ | ○ | ◉ | ◉ | ○ | ◉ | ◉ | ◉ |
| "DOWFAX XDS" 8292.00 | ○ | ○ | ○ | ○ | ○ | ○ | ◉ | ◉ | ○ | ◉ | ◉ | ○ |
| SODIUM XYLENE SULFONATE | ○ | ○ | ○ | ○ | ○ | ○ | ◉ | ◉ | ◉ | ◉ | ◉ | ◉ |

◉ Separated into 2 liquid phases.
○ Single phase.

As can be seen by the data in Table 1, although a variety of solubilizing agents were effective at ambient temperatures, only the solubilizers according to the present invention were effective at higher temperatures with the "DOWFAX XDS" 8292 being even more preferred.

EXAMPLE 2

This example illustrates the stability of a 0.5 wt % solution of $C_{12}$ AOS and "DOWFAX XDS" 8292.00 in Brines A and B.

This example was performed at a number of concentrations and a variety of temperatures. The results are illustrated in Table II.

TABLE II

| RATIO OF AOS-12 TO 8292.00 | ROOM TEMP. | HELD AT EACH TEMPERATURE FOR 24 HOURS | | | | | FOR 6 HRS[1] 225° F. | ROOM TEMP. | HELD AT EACH TEMPERATURE FOR 24 HOURS | | | | | FOR 8 HRS[1] 225° F. |
|---|---|---|---|---|---|---|---|---|---|---|---|---|---|---|
| | | 100 | 125 | 150 | 175 | 200 | | | 100 | 125 | 150 | 175 | 200 | |
| 0:100 | ○ | ○ | ○ | ○ | ○ | ○ | ○ | ○ | ○ | ○ | ○ | ○ | ○ | ○ |
| 50:50 | ○ | ○ | ○ | ○ | ○ | ○ | ○ | ○ | ○ | ○ | ○ | ○ | ○ | ○ |
| 80:20 | ○ | ○ | ○ | ○ | ○ | ○ | ○ | ◉ | ○ | ○ | ○ | ○ | ○ | ○ |
| 82.5:17.5 | ○ | ○ | ○ | ○ | ○ | ○ | ◐ | ◉ | ○ | ○ | ○ | ◐ | ◐ | ◐ |
| 85:15 | ○ | ○ | ○ | ○ | ○ | ◐ | ◐ | ◉ | ○ | ○ | ○ | ◐ | ◐ | ◐ |
| 87.5:12.5 | ○ | ○ | ○ | ○ | ◐ | ◐ | ◐ | ● | ◉ | ○ | ◉ | ◐ | ◐ | ◐ |
| 90:10 | ○ | ○ | ○ | ◐ | ◐ | ◐ | ◐ | ● | ◉ | ◉ | ◐ | ◐ | ◐ | ◐ |
| 100:0 | ⊛[2] | ◉ | ◐ | ◐ | ◐ | ◐ | ◐ | ●[2] | ◉ | ◉ | ◐ | ◐ | ◐ | ⊛ |
| | | | | BRINE A (SYNTHETIC RESERVOIR BRINE) | | | | | | | BRINE B (110% STRENGTH BRINE A) | | | |

◐ Separated into 2 liquid phases.
○ ◉ ◉ ◐ ◐ ● Degrees of cloudiness, from barely noticeable to nearly opaque.
⊛ Floating filmy solid phase formed that broke into small particles when container was shaken.
[1]Time at this temperature was shorter due to temperature and pressure limits of containers.
[2]Solid phase formed several days after preparation.

As can be seen by the data in Table II, at higher temperatures an increased amount of solubilizing agent is required in order to provide a single phase composition. Moreover, this data illustrates the ability to provide adequate solubility at the desired 4:1 ratio of AOS to solubilizing agent even at temperatures of 200°–225° F.

COMPARATIVE EXAMPLES III

In this comparative example, a variety of traditional solubilizers are tested with $C_{12}$ AOS in synthetic brines.

Table III illustrates the results associated with a solution containing 0.5% $C_{12}$ AOS and 0.1% additive in Brine C at both room temperature and 150° F.

Table IV illustrates the compositions including 0.05% of certain comparative solubilizers at room temperature and 150° F.

TABLE III 0.5% $C_{12}$ AOS + 0.1% Additive in Brine C

| ADDITIVE | ROOM TEMPERATURE | 150° F. | DESCRIPTION OF ADDITIVE |
|---|---|---|---|
| "TERGITOL" 15-S-30 | SL. CLOUDY | CLOUDY | Secondary alcohol + 30 ethoxy groups |
| "TERGITOL" 15-S-40 | CLEAR | CLOUDY | Secondary alcohol + 30 ethoxy groups |
| "MAZAMIDE" LS-173 | CLOUDY | CLOUDY | $C_{12}$ & $C_{14}$ diethanolamine superamide |
| "MAZEEN" C-5 | CLOUDY | CLOUDY | Polyoxyethylene coco amine (5 ethoxy groups) |
| "MAZEEN" C-15 | CLEAR | CLOUDY | Polyoxyethylene coco amine (15 ethoxy groups) |
| "MONAMID" 150-AD | CLOUDY | CLOUDY | Coco alkanolamide |
| "ALKAMIDE" 2204 | CLOUDY | CLOUDY | Fatty acid alkanomide |
| "ALKAMIDE" 2004 | CLOUDY | CLOUDY | Coco diethanolamine |
| "JORDAMOX" ODA | CLOUDY | CLOUDY | Oleylamine oxide |
| "JORDAMOX" CAPA | CLOUDY | CLOUDY | Cocoamidopropyl amine oxide |
| "JORDAMOX" MDA | CLOUDY | CLOUDY | Myristamine oxide |
| "JORDAPHOS" JS61 | CLOUDY | CLOUDY | Aromatic phosphate ester |
| "JORDAPHOS" JS60 | CLOUDY | CLOUDY | Aliphatic phosphate ester |
| "CONCOFAC" 690-70 | CLEAR | CLOUDY | Free acid complex phosphate ester |
| EDTA | CLOUDY | CLOUDY | 2-methylpentanediol-2,4 |
| Hexylene glycol | S. CLOUDY | CLOUDY | Ethylene diamine tetraacetate |
| LIPA | CLOUDY | S. CLOUDY | Laurylisopropyl mono amide |
| "CAPRAMIDE" DEA | CLOUDY | CLOUDY | $C_{10}$ fatty acid diethanolamine |
| "MIRAMINE" DD | CLOUDY | CLOUDY | Stearylaminopropyl dimethylamine |
| "MAZEEN" S-10 | CLEAR | CLOUDY | Polyoxyethylene soya amine (10 ethoxy groups) |
| "MAZEEN" T-10 | CLOUDY | S. CLOUDY | Polyoxyethylene mixed fatty amines (tall oil, 10 ethoxy groups) |
| "DUOMEEN" C | CLOUDY | CLOUDY | Coco diamine |
| "DEQUEST" 2010 | CLOUDY | CLOUDY | Hydroxy-ethylidene diphosphonic acid |

TABLE IV 0.5% $C_{12}$ AOS + 0.05% Additive in Brine C

| ADDITIVE | ROOM TEMPERATURE | 150° F. | DESCRIPTION OF ADDITIVE |
|---|---|---|---|
| "HENKEL NES"-25 | CLOUDY | CLOUDY | $C_{9-11}$ alcohol + 2.5 ethoxy sulfonate |
| "DOWFAX" 2A1 | CLOUDY | CLOUDY | Sodium xylene sulfonate |
| SXS | CLEAR | CLEAR | Sodium xylene sulfonate |
| APG300 | CLOUDY | CLOUDY | Alkylpoly glycoside |
| APG350 | CLOUDY | CLOUDY | Alkylpoly glycoside |
| APG500 | CLOUDY | CLOUDY | Alkylpoly glycoside |
| APG550 | CLOUDY | CLOUDY | Alkylpoly glycoside |
| NES-20 | CLOUDY | CLOUDY | $C_{8-10}$ alcohols + 2 |

TABLE IV-continued

| | 0.5% $C_{12}$ AOS + 0.05% Additive in Brine C | | |
|---|---|---|---|
| ADDITIVE | ROOM TEMPERATURE | 150° F. | DESCRIPTION OF ADDITIVE |
| NES-1412 | CLEAR | CLOUDY | ethoxy sulfonate $C_{12-15}$ alcohols + 12 ethoxy sulfonate |
| SL-92 | CLEAR | CLOUDY | Polyalkylene glycol ether |

As can be seen, the data presented in Tables I–IV illustrate the surprising ability of the solubilizers according to the present invention to increase the brine tolerance of certain AOS surfactants. In fact, this data illustrates that many traditional solubilizing agents are not effective when employed with the α-olefin sulfonate compositions according to the present invention, even at room temperature and at ratios as high as 5:1. Thus, this data contains the unexpected superiority of the present invention even at relatively high reservoir temperatures.

While the invention has been described in terms of various preferred embodiments, the artisan will appreciate that various modifications, substitutions, omissions, and changes may be made without departing from the spirit thereof. Accordingly, it is intended that the scope of the present invention be limited solely by the scope of the following claims including the equivalents thereof.

It is claimed that:

1. A method of recovering hydrocarbons from a reservoir during gas injection into said reservoir comprising:

(a) at least periodically injecting gas and a foam-forming composition into a reservoir wherein the reservoir temperature is not less than about 100° F.;

wherein the foam-forming composition comprises brine having not less than about 10% TDS, an effective foam-forming amount of a surfactant comprising a $C_{10-16}$ AOS having a major amount of at least one of $C_{10}$ AOS and $C_{12}$ AOS, and an effective amount of at least one solubilizing component to increase the brine tolerance of the foam-forming composition, which solubilizing component is a mixture comprising

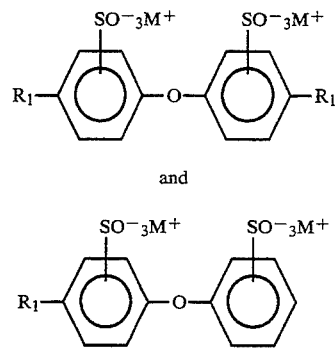

and where M is H, an alkali metal, alkaline earth metal, or ammonium, and $R_1$ is a linear $C_6$–$C_{16}$ alkyl group; and (b) contacting hydrocarbons in the reservoir with the foam and the gas so as to assist in the recovery of hydrocarbons from the reservoir.

2. A method according to claim 1 wherein said surfactant comprises a $C_{10-16}$ AOS composition which has a major amount of $C_{12}$ AOS.

3. The method according to claim 2 wherein $R_1$ is a linear $C_6$, $C_{10}$, or $C_{16}$ alkyl group.

4. The method according to claim 3 wherein the weight ratio of the AOS to solubilizing component(s) is not less than about 3:1.

5. The method according to claim 3 wherein the gas is selected from among carbon dioxide, nitrogen, methane, flue gas or mixtures of hydrocarbons, and/or flue gas.

6. The method according to claim 3 wherein the reservoir temperature is not less than about 150° F.

7. The method according to claim 2 wherein $R_1$ is a linear $C_6$ alkyl group.

8. The method according to claim 7 wherein M is sodium.

9. The method according to claim 7 wherein the weight ratio of AOS to solubilizing component(s) is not less than about 3:1.

10. The method according to claim 9 wherein the weight ratio of AOS to solubilizing component(s) is about 4:1.

* * * * *